United States Patent
Nugent

[11] Patent Number: 6,036,897
[45] Date of Patent: Mar. 14, 2000

[54] ROTATIONAL MOLDING APPARATUS AND METHOD USING INFRARED THERMOMETRY

[75] Inventor: Paul J. Nugent, Reading, Pa.

[73] Assignee: Remcon Plastics, Inc., Reading, Pa.

[21] Appl. No.: 09/042,584

[22] Filed: Mar. 17, 1998

Related U.S. Application Data

[60] Provisional application No. 60/039,382, Mar. 21, 1997.

[51] Int. Cl.[7] .......................... B29C 41/06; B29C 41/46; B29C 41/52
[52] U.S. Cl. ...................... 264/40.6; 264/311; 264/410; 425/144; 425/435
[58] Field of Search ................................. 264/40.1, 40.6, 264/310, 311, 410; 425/144, 145, 435

[56] References Cited

U.S. PATENT DOCUMENTS

| | | |
|---|---|---|
| 4,183,883 | 1/1980 | Blair . |
| 4,185,068 | 1/1980 | Schmidt et al. . |
| 4,241,005 | 12/1980 | Rothschild et al. . |
| 4,331,626 | 5/1982 | Colby . |
| 4,740,337 | 4/1988 | Gale et al. . |
| 4,755,333 | 7/1988 | Gray . |
| 4,970,045 | 11/1990 | Steinberg et al. . |
| 5,194,197 | 3/1993 | Munk et al. . |
| 5,316,701 | 5/1994 | Payne . |
| 5,322,654 | 6/1994 | Crawford et al. . |
| 5,503,780 | 4/1996 | Payne . |
| 5,705,200 | 1/1998 | Payne . |
| 5,868,979 | 2/1999 | Glenn ..................................... 264/40.6 |

FOREIGN PATENT DOCUMENTS

| | | |
|---|---|---|
| 2595975 | 9/1987 | France . |
| 2659047 | 9/1991 | France . |
| 4-25417 | 1/1992 | Japan . |
| 7-88864 | 4/1995 | Japan . |
| WO 96/38281 | 12/1996 | WIPO . |

*Primary Examiner*—Jill L. Heitbrink
*Attorney, Agent, or Firm*—Caesar, Rivise, Berstein Cohen & Pokotilow, Ltd.

[57] ABSTRACT

A rotational molding apparatus that utilizes stationary temperature sensors, e.g., infra-red thermometry (IRT) sensors, for continuously monitoring the temperature of the molds during rotation.

31 Claims, 5 Drawing Sheets

ROTATIONAL MOLDING APPARATUS AND METHOD USING INFRARED THERMOMETRY

RELATED APPLICATIONS

This is a utility patent application based upon provisional patent Application Ser. No. 60/039,382, filed on Mar. 21, 1997, entitled, ROTATIONAL MOLDING APPARATUS USING INFRARED THERMOMETRY FEEDBACK. Applicant hereby incorporates by reference the entire subject matter of the '382 provisional patent application and also claims the benefit of the filing date of the '382 provisional patent application for this utility patent application.

SPECIFICATION

1. Field of the Invention

This invention relates generally to molding apparatus, more particularly, to rotational molding processes.

2. Background of the Invention

Rotational molding is a processing method for producing hollow articles made of synthetic plastics material. The process involves the steps of: (1) placing a measured amount of powdered or liquid plastic material in a hollow metal, glass fiber reinforced or ceramic mold; (2) rotating the mold about two perpendicular axes to distribute the material around the inner surface; (3) placing the rotating mold in an oven to heat the material and cause it to adhere to the inner surface of the mold; (4) cooling the mold using air, water or a combination of both to solidify the plastic to form a hollow part; and (5) removing the part from the mold. U.S. Pat. Nos. 4,183,883 (Blair); 4,241,005 (Rothschild et al.); 4,331,626 (Colby); 4,755,333 (Gray); 4,970,045 (Steinberg et al.); 5,316,701 (Payne); 5,503,780 (Payne) and 5,705,200 (Payne) concern rotational molding apparatus and methods.

The rotational molding technique has been used commercially for about 37 years but there are a number of practical problems. Firstly, it is very difficult to know when the powder has melted. This is usually established by trial and error and results in a considerable amount of wasted material. This is because the heat transfer characteristics can vary depending on the type of oven used to heat the mold, the ambient conditions, the nature of the powder, the type of plastics, the wall thickness of the molding, the material and thickness of the mold, etc. Also, even when the powder has melted, it is difficult to know how long the mold should remain in the oven to obtain the optimum properties from the molded article. Rotational molding to date has no means of attaining closed loop control due to the difficulties of gathering data continuously during the production.

One solution to these problems is disclosed in U.S. Pat. No. 5,322,654 (Crawford et al.) assigned to the Queen's University of Belfast, Belfast, United Kingdom. In particular, the Crawford et al. patent discloses a system that senses the internal air temperature within the mold to monitor the various stages within the rotating molding cycle. The process disclosed therein uses a sensor mounted on the arm of the molding machine for monitoring the internal temperature of the mold. The sensor output is coupled to a microprocessor which is also mounted to the arm. The microprocessor processes the sensor signal and also comprises means for transmitting the appropriate temperature data, via RF (radio frequency), IR (infra-red) transmission or via datalogging, to a control system.

However, the above system is limited in that the operation of the transmitting is restricted by the temperature of the oven which prevents the sensor from being used continuously in a production environment. Furthermore, the positioning of the sensor within the rotating mold and the positioning of the microprocessor on the rotating arm makes this system complex and introduces failure modes due to this movement.

Other related U.S. patents that are do not involve rotational molding but utilize temperature monitoring are: U.S. Pat. No. 4,740,337 (Gale et al.) which discusses the use of non-contact infra-red sensors for monitoring a mold cavity temperature; U.S. Pat. No. 5,194,197 (Munk et al.) which discusses the detection of temperature patterns for use in a production mold method.

Therefore, there remains a need for a rotational molding process that can measure the temperature of the mold continuously while utilizing static sensors and processing.

OBJECTS OF THE INVENTION

Accordingly, it is the general object of this invention to provide an apparatus which addresses the aforementioned needs.

It is a further object of this invention to provide a rotational molding apparatus that can continuously measure the temperature of the mold.

It is yet another object of this invention to provide a rotational molding apparatus that utilizes static sensors.

It is still yet a further object of this invention to provide a rotational molding apparatus that utilizes static processing.

It is yet another object of this invention to provide a rotational molding apparatus that does not require the use of sensors requiring wireless transmission of the sensed data.

It is still yet a further object of the present invention to provide a rotational molding apparatus having sensors that are directly coupled to a control means.

SUMMARY OF THE INVENTION

These and other objects of the instant invention are achieved by providing a rotational molding apparatus for molding a hollow article in a molding process. The rotational molding apparatus comprises at least one mold for receiving a molding material and having an outer surface and means for rotating the at least one mold (e.g., a carousel style rotating molding machine). The apparatus further comprises means for continuously measuring the temperature of the outer surface of the at least one mold (e.g., infra-red sensors) throughout the molding process and for outputting signals representative of the temperature throughout the molding process. The apparatus also comprises means for controlling operation of the rotational molding apparatus (e.g., a programmable logic controller, personal computer, etc.) in dependence upon the measured temperature and wherein the means for controlling operation of the rotational molding apparatus is coupled to the means for rotating the mold and to the means for continuously measuring the temperature of the outer surface of the at least one mold for receiving the signals throughout the molding process.

These and other objects of the instant invention are achieved by providing a method for molding a hollow article in a rotational molding apparatus, the method comprising the steps of: (a) placing a molding material in at least one mold; (b) rotating the at least one mold at appropriate times during the molding process; (c) alternately disposing the at least one mold in a heating environment and in a cooling environment; (d) continuously monitoring the temperature of the outer surface of the at least one mold throughout the molding process; and (e) controlling steps b and c based on the temperature of the outer surface of the at least one mold throughout the molding process.

DESCRIPTION OF THE DRAWINGS

Other objects and many of the attendant advantages of this invention will be readily appreciated as the same becomes better understood by reference to the following detailed description when considered in connection with the accompanying drawings wherein.

DESCRIPTION OF THE PREFERRED EMBODIMENT OF THE INVENTION

Figure 1:
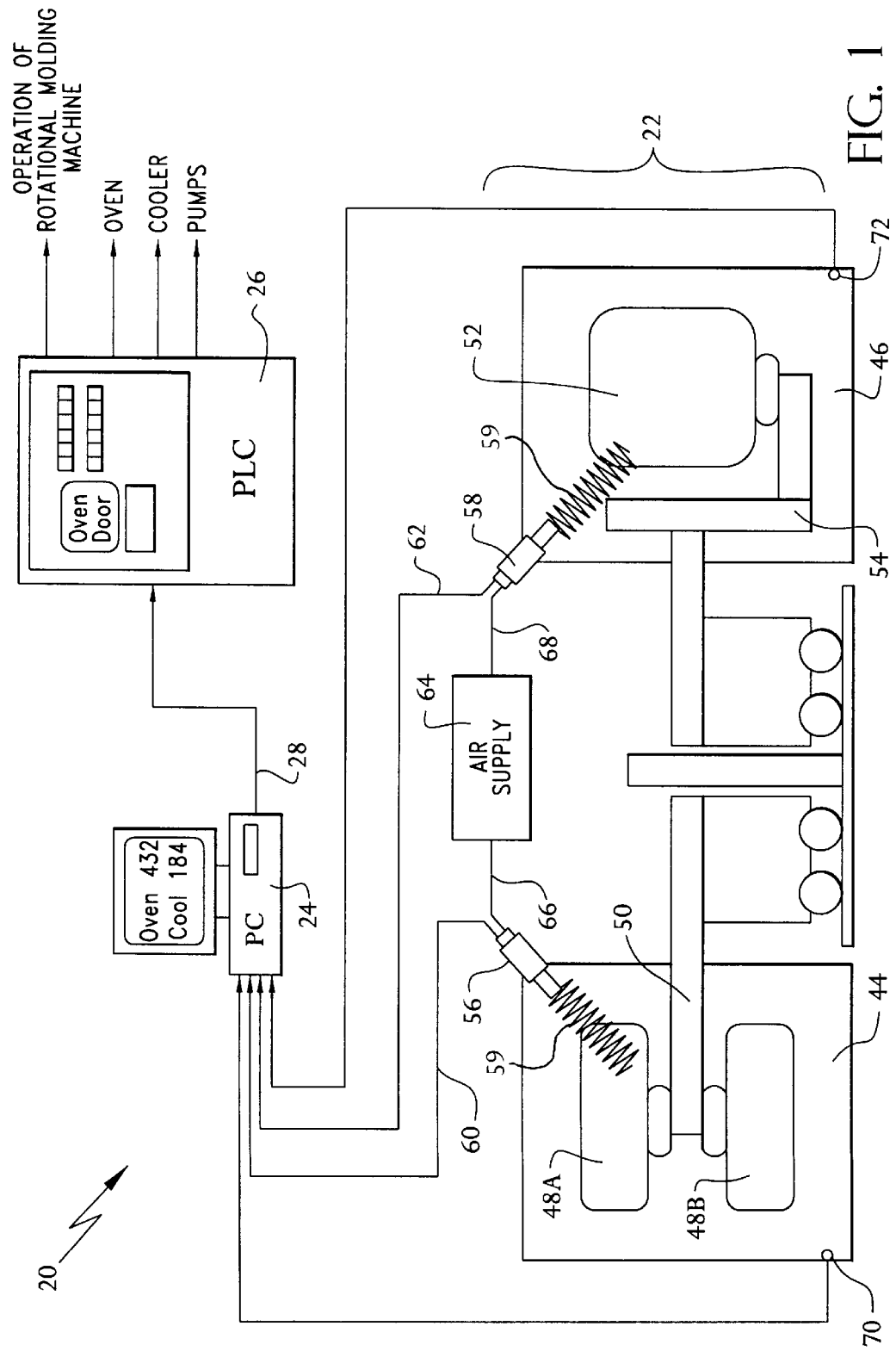
FIG. 1 is a block diagram of the present invention.

Referring now in greater detail to the various figures of the drawing wherein like reference characters refer to like parts, a rotational molding apparatus (hereinafter "RMA") constructed in accordance with the present invention is shown generally at 20 in FIG. 1.

The RMA 20 comprises a rotating molding machine 22 (e.g., a Ferry 280 Carousel Style Rotational Molding Machine), a conventional personal computer (PC) 24 having 4–20 mA circuit (not shown) that is connected to an A/D converter (also not shown) installed in the PC 24, and a conventional programmable logic controller (PLC) 26. In general, the PLC 26 controls the entire RMA 20 operation based on, among other things, inputs 28 from the PC 24. It is within the broadest scope of this invention that the inputs 28 can be directly fed to the PLC 26 from the PC 24 (through an electronic coupling), or alternatively, an operator (not shown) can manually feed these inputs 28 into the PLC 26.

Although any type of rotating molding machine can be used in the present invention, a Ferry 280 Carousel Style Rotational Molding Machine is used as an example. As shown more clearly in FIG. 2, the rotating molding machine (hereinafter "RMM") 22 comprises a plurality of arms 30, 32, 34 coupled to a common spindle 36 and each having a respective mold 38, 40 and 42 (or molds 48A and 48B as discussed below; also see FIG. 1) coupled to one end. A number of stations form the molding process and include an Load/Unload stage, an Oven stage, a Pre-Cool stage and a Cooler stage; thus, the RMM 22 includes an oven 44 and a cooler 46. The PLC 26 controls the rotation of the RMM 22 at the appropriate times to dispose the particular molds 34–36 at respective stations during the molding process. Although not shown, the RMM 22 rotates each mold about two perpendicular axes to distribute the material around the inner surface of the molds 38–42.

It should be noted that FIG. 1 depicts two types of molds and two types of RMM arms to accommodate these molds. In particular, two small molds 48A and 48B are shown coupled to a "straight" arm 50, all of which are shown disposed in the oven 44. A single, large mold 52 is shown coupled to a "drop" arm 54 (i.e., right-angle mount), all of which are disposed in the cooler 46. Thus, the RMM 22 can accommodate a variety of mold types.

The external surface temperature of the mold can be related to the internal temperature of the mold which influences the plastic material and an enclosed volume of air. The RMA 20 relates the external surface temperature of a mold to the state of the part inside. There is a relationship between the external mold surface temperature and the state of the cure of the part. This can define the ultimate physical performance of the plastic by monitoring the temperature to which the material is heated and the rate at which it is cooled. This RMA 20 gathers data remotely over the surface of the mold during rotation at all stages in the process and uses this data to control operation of the machine.

High speed sensors 56 and 58, e.g., infra-red thermometry (IRT) sensors, such as the SHTXSLTSFW Thermalert TX sensor, detect the surface temperature of the mold and spider (a supporting frame for the mold, not shown, that holds the mold to its corresponding arm) as it rotates in the oven 44 and cooler 46, respectively. Each of these sensors 56 and 58 are electrically coupled to the 4–20 mA circuit connected to the A/D converter installed in the PC 24 via high temperature sensor cables 62 and 64, respectively. Each cable comprises two wires. The sensors 56 and 58 are powered by the power supply (not shown) in the PC 24. These sensors are continuously energized to receive emission data, thus providing the PC 24 with continuous temperature data. In principle, these sensors 56 and 58 are continuously detecting emissions 59 in the IR band (wavelengths of approximately 0.75 to 1000 $\mu$m); thus, the IRT sensors 56 and 58 measure the emissions 59 from the mold, and not from the powder (not shown) inside the mold. These sensors 56 and 58 are fixedly secured to a wall of the oven 44 and cooler 46, respectively, thus eliminating the need for an insulated transmitter which requires periodic cooling.

The sensors 56 and 58 are also connected to an air supply 64 (e.g., 110 psi) via air lines 66 and 68, respectively, to cool and flush the sensors 56 and 58 with approximately 10 psi of pressure.

Background temperatures may be eliminated from the data stream by mounting thermocouples 70 and 72 on the opposing face of the oven 44 and the cooling chamber 46 from the monitoring sensors 56 and 58, respectively. The opposing faces represent a high temperature in the oven and a low temperature in the cooler. Thus, the IRT sensors 56 and 58, the thermocouples 70 and 72 and the PC 24 provide for a static temperature sensing system.

Figure 2:
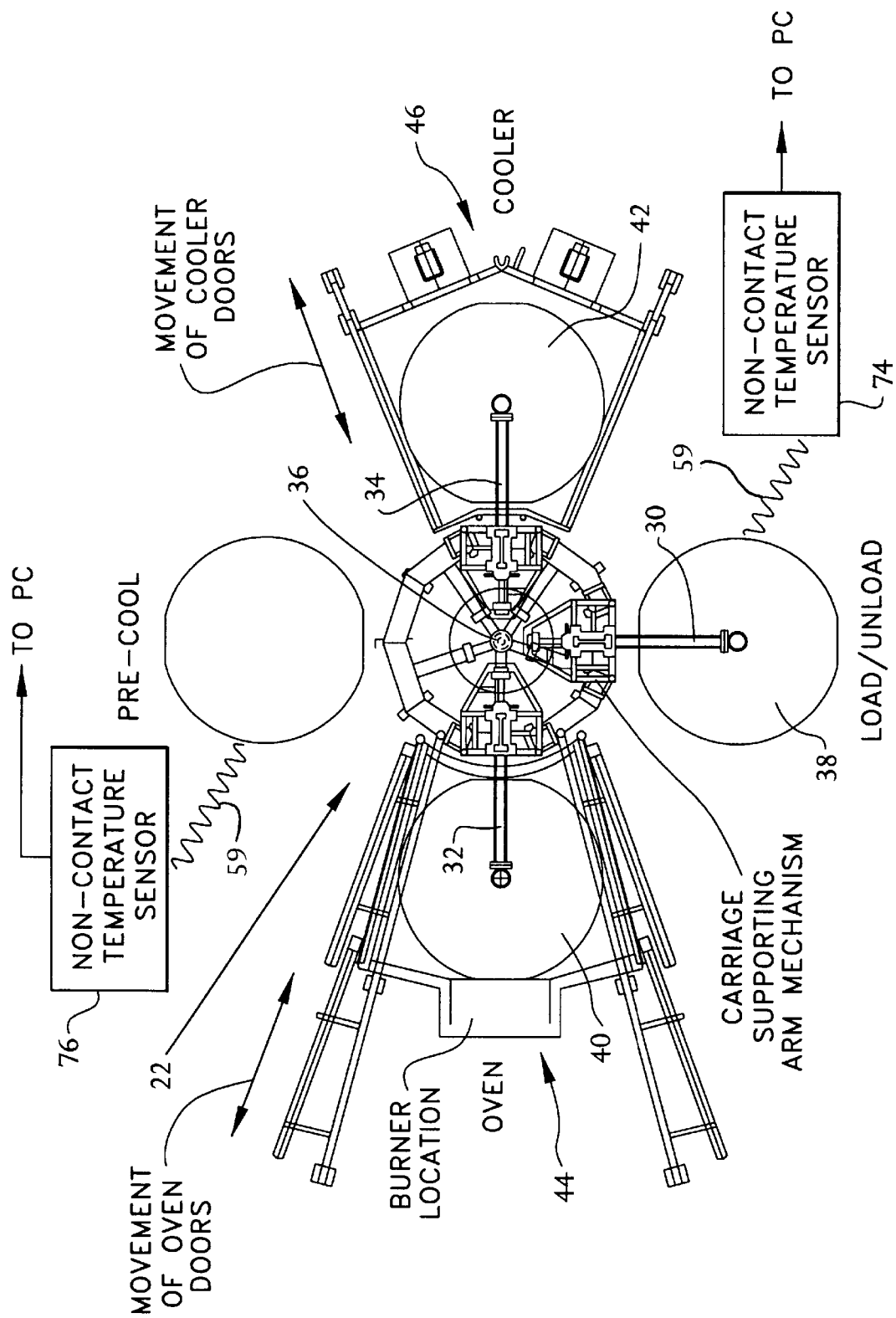
FIG. 2 is a top view of a portion of a rotational molding machine.

As can be seen in FIG. 2, non-contact temperature sensors 74 and 76 (e.g., IRT sensors-SHTXSLTSFWThermalert TX sensors) are positioned at the Load/Unload station and at the Pre-Cool station, respectively, to permit the monitoring of mold temperatures at those respective locations. Thus, the IRT sensors 56 and 58, the thermocouples 70 and 72, the IRT sensors 74 and 76 and the PC 24 together form means for continuously measuring the temperature of the outer surface of the mold. It is thus within the broadest scope of this invention to include temperature sensors at all stages of the molding process to provide for such continual monitoring of the mold surface temperature throughout the molding process.

Software in the PC 24 addresses the A/D card and scans data up to 20 times per second. As the data is read, it is stored and filtered for high and low temperature readings-it can also be processed to provide averaged data over short time intervals. The data can also be analyzed for rates of temperature change (slopes of temperature curves).

Data collection can be synchronized in configurations which have multiple molds so that the data is collected and stored for each individual mold. This is particularly useful for straight arm 50 configurations which have the two molds 48A and 48B. Position sensors (not shown) can be linked to the arm 50 so that the orientation of the arm 50 is known and used by the software in the PC 24.

The software contained in the PC 24 gathers and filters the sensor data. The software then analyzes the data and makes decisions for operation of the RMM 20 based on that data. The software necessary for filtering and analyzing the temperature data is well-known by those skilled in the art of IRT sensor processing and, as such, is not discussed any further in this application.

Figure 3:
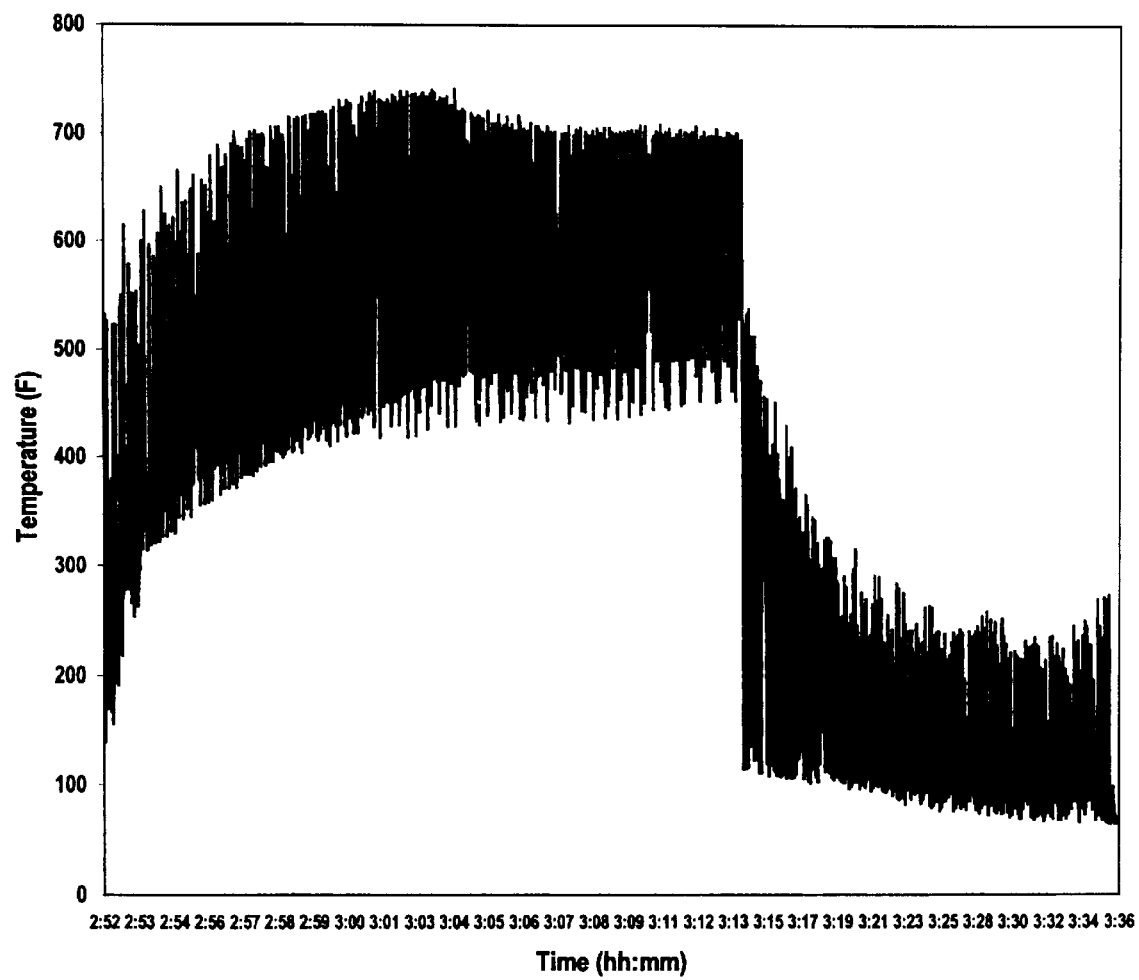
FIG. 3 is a graph of temperature versus time depicting typical raw data from infra-red thermometry sensors located in an oven station and in a cooling station.

FIG. 3 shows a typical set of raw data collected during a rotational molding cycle. The data is then filtered to provide a temperature curve which can be used to indicate the correct and consistent point at which to remove the cured part from the oven 44 and the cooler 46. The filtered data can consist of several components but is principally a series of minimum temperatures in the oven 44 and a series of maximums in the cooler 46.

In the oven 44, the mold is the coolest object within the hot environment. Minimum temperatures are observed at regular points in the rotation cycle and are associated with the low temperature spots on the surface of the mold. Patterns of temperature distribution can be observed across the mold surface, supporting frame and the opposing wall of the oven 44. Thus, the IRT sensor 56 basically looks for the coldest spot on any of the molds in the oven 44 and informs the PC 24/PLC 26 which then terminates the heating process when that coldest spot reaches a predetermined temperature (e.g., 500° F.).

In the cooler 46, the mold is the hottest object within the cool environment. Maximum temperatures are observed at regular points in the rotation cycle and are associated with the high temperature spots on the surface of the mold. Similarly, in the cooler, the IRT sensor 58 looks for the hottest spot on any of the molds and informs the PC 24/PLC 26 which then terminates the cooling process when the hottest spot reaches the predetermined temperature (e.g., 75° F.).

The use of surface temperature feedback can be used to control the actions of the rotational molding machine by monitoring and predicting the rate of heating and cooling of the mold. These rates can be used to slow down or speed up heating or cooling of the mold to balance the performance of the machine or to control the quality of the molded parts produced.

As stated earlier, the data may be processed by the PC 24 and passed to the machine control system (not shown) or passed directly to the PLC 26 or computer (not shown) in control of the machine 22.

An example of the RMA 20 in use may be described by, but not limited to, the following process: A steel mold 52 of dimensions approximately 48"×48"×48" mounted on the arm 54 of a Ferry 280 molding machine 22 is loaded with 100 lbs of LLDPE plastic powder. The mold 52 is rotated at a ratio of 8:2 (primary to secondary axes) in an oven 44 at a temperature of 650° F. An IRT sensor 56 is mounted through the wall of the oven 44 and records the surface temperature of the mold 54 at a rate of 20 times per second. The data is recorded by a PC 24 located adjacent to the control panel (not shown) of the machine 22 and is displayed in real time during the cycle. The data is filtered and monitored for a time and temperature relationship-when the mold surface temperature reaches 500° F. as recorded by the IRT sensor 56, the mold is indexed from the oven 44 to the cooling station 46. In the cooling station 46, another IRT sensor 58 monitors the surface temperature during the cooling cycle and passes the data back to the PC 24. The data is again monitored and filtered-when the mold surface temperature reaches 75° F., the mold 52 is removed from the cooling area.

Figure 4:
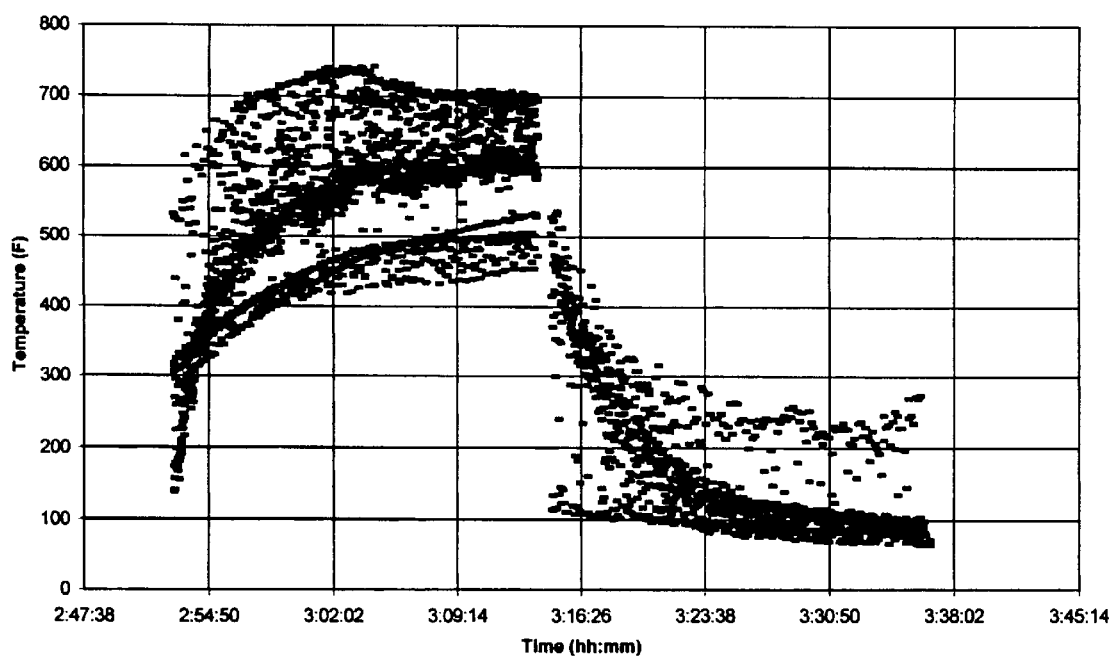
FIG. 4 is a scatter chart of the data of FIG. 3 for analyzing patterns or trends within the data.
Figure 5:
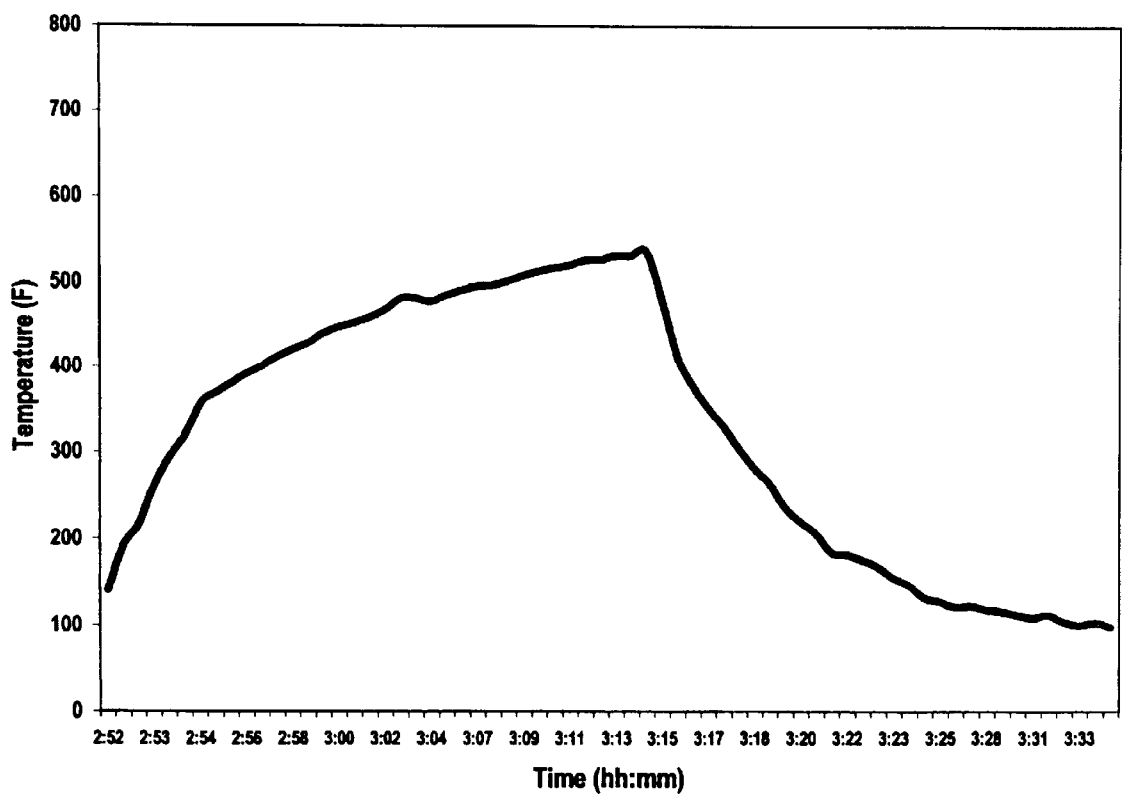
FIG. 5 is the processed data of FIG. 3 which forms a control curve.

The temperature targets at the end of the oven cycle (500° F.) and at the end of the cooling cycle (75° F.) were established from best molding cycles determined by previous molding trials. Impact trials on a number of molded parts were used to establish the processing window for the material under trial. The surface temperature of the mold required to produce parts in this processing window were determined during these trials. In particular, FIG. 3 depicts raw data captured at rates up to 20 times per second. FIG. 4 depicts the raw data as a scatter chart to analyze for patterns and trends within the data; it can be seen that there are distinct bands of temperature relating to the mold surface temperature and the background temperature of the oven. FIG. 5 depicts processed data which tracks the minimum series of data within the main mass of data to provide a control curve. This plot of minimum temperatures produces a single curve which can be used to compare and control the molding of an individual mold.

The data captured as the surface of the mold does not have the sensitivity of internal temperature for comparison of part properties. However, tests on a number of molded parts have shown that the external surface temperature can be related to the temperatures within the mold. These tests used a series of oven temperatures (600, 575, 550 and 525° F.) to produce the parts. The parts were removed when the internal temperature reached the same point. It was observed that the external surface temperature could be directly related to the final peak internal temperature within the mold. As the oven temperature was reduced, the oven cycle needed to be increased to allow the part to reach the same temperature-this could be observed using the external surface temperature.

It is within the broadest scope of this invention to include an RMA 20 in which the PLC 26 is directly coupled to the RMM 22.

Without further elaboration, the foregoing will so fully illustrate my invention that others may, by applying current or future knowledge, readily adopt the same for use under various conditions of service.

I claim:

1. A method for molding a hollow article in a rotational molding apparatus, the method comprising the steps of:
   (a) placing a molding material in at least one mold;
   (b) rotating the at least one mold in a heating environment during a heating stage and in a cooling environment during a cooling stage during the molding process;
   (c) monitoring the temperature of the outer surface of the at least one mold throughout the heating stage and the cooling stage using temperature sensors that do not contact said at least one mold; and
   (d) controlling step b based on the temperature of the outer surface of the at least one mold throughout the heating stage and the cooling stage.

2. The method of claim 1 wherein said step of monitoring the temperature of the outer surface of the at least one mold further comprises the steps of monitoring the temperature of the heating environment during the heating stage and monitoring the temperature of the cooling environment during the cooling stage.

3. The method of claim 2 wherein said step of controlling step b further comprises controlling step b based on the temperatures of the heating environment and of the cooling environment.

4. The method of claim 1 further comprising the steps of:
   (a) disposing the at least one mold in a load stage before disposing the at least one mold in said heating environment; and
   (b) monitoring the temperature of the outer surface of the at least one mold while the at least one mold is in said load stage.

5. The method of claim 1 further comprising the steps of:
   (a) disposing the at least one mold in a pre-cool stage before disposing the at least one mold in said cooling environment; and
   (b) monitoring the temperature of the outer surface of the at least one mold while the at least one mold is in said pre-cool stage.

6. The method of claim 1 wherein said step of rotating the at least one mold comprises rotating the at least one mold about two perpendicular axes in order to distribute the molding material around an inner surface of the at least one mold.

7. The method of claim 1 wherein said step of monitoring the temperature of the outer surface of the at least one mold is accomplished using stationary sensors.

8. The method of claim 7 wherein said step of monitoring the temperature of the outer surface of the at least one mold is accomplished using infra-red thermometry sensors.

9. The method of claim 1 wherein the step of controlling step b based on the temperature of the outer surface of the at least one mold comprises terminating said heating stage whenever the coldest spot on said outer surface reaches a predetermined temperature.

10. The method of claim 9 wherein said predetermined temperature is approximately 500° F.

11. The method of claim 1 wherein the step of controlling step b based on the temperature of the outer surface of the at least one mold comprises terminating said cooling stage whenever the hottest spot on said outer surface reaches a predetermined temperature.

12. The method of claim 11 wherein said predetermined temperature is approximately 75° F.

13. The method of claim 1 wherein said step of controlling step b based on the temperature of the outer surface of the at least one mold throughout the heating stage and the cooling stage comprises monitoring rates of heating and cooling of the at least one mold.

14. The method of claim 13 wherein said step of controlling step b based on the temperature of the outer surface of the at least one mold throughout the heating stage and the cooling stage comprises predicting rates of heating and cooling.

15. The method of claim 1 wherein said step of controlling step b based on the temperature of the outer surface of the at least one mold throughout the heating stage and the cooling stage further comprises generating a control curve for controlling molding of the at least one mold.

16. A rotational molding apparatus for molding a hollow article in a molding process having a heating stage and a cooling stage, said rotational molding apparatus comprising:

at least one mold for receiving a molding material and having an outer surface;

means for rotating the at least one mold during the heating stage and the cooling stage;

means for measuring the temperature of the outer surface of the at least one mold, without contacting the at least one mold, during the heating stage and the cooling stage and for outputting signals representative of the temperature throughout the heating stage and the cooling stage; and means for controlling operation of said rotational molding apparatus in dependence upon the measured temperature, said means for controlling operation of said rotational molding apparatus being coupled to said means for rotating the at least one mold and to said means for measuring the temperature of the outer surface of the at least one mold for receiving said signals throughout the heating stage and the cooling stage.

17. The apparatus of claim 16 wherein said means for measuring the temperature comprises at least one infra-red thermometry sensor disposed in a heating chamber at a first stationary location.

18. The apparatus of claim 17 wherein said means for measuring the temperature further comprises at least one infra-red thermometry sensor disposed in a cooling chamber at a second stationary location.

19. The apparatus of claim 17 wherein said means for measuring the temperature further comprises at least one thermocouple disposed in the heating chamber at a third location that is opposite said first stationary location.

20. The apparatus of claim 18 wherein said means for measuring the temperature further comprises at least one thermocouple disposed in the cooling chamber at a fourth stationary location that is opposite said second stationary location.

21. The apparatus of claim 16 wherein said means for measuring the temperature further comprises at least one infra-red thermometry sensor disposed in a load/unload station at a fifth stationary location.

22. The apparatus of claim 16 wherein said means for measuring the temperature further comprises at least one infra-red thermometry sensor disposed in a pre-cool station at a sixth stationary location.

23. The apparatus of claim 17 wherein said means for controlling operation of said rotational molding apparatus terminates the heating stage whenever said infra-red thermometry sensor detects that the coldest spot on said outer surface reaches a predetermined temperature.

24. The apparatus of claim 23 wherein said predetermined temperature is approximately 500° F.

25. The apparatus of claim 18 wherein said means for controlling operation of said rotational molding apparatus terminates the cooling stage whenever said infra-red thermometry sensor detects that the hottest spot on said outer surface reaches a predetermined temperature.

26. The apparatus of claim 25 wherein said predetermined temperature is approximately 75° F.

27. The apparatus of claim 16 wherein said means for controlling operation of said rotational molding apparatus monitors and predicts a rate of heating of the at least one mold based on said measured temperature signals in order to control said operation.

28. The apparatus of claim 27 wherein said means for controlling operation of said rotational molding apparatus monitors and predicts a rate of cooling of the at least one mold based on said measured temperature signals in order to control said operation.

29. The apparatus of claim 28 wherein said means for controlling operation of said rotational molding apparatus generates a control curve for controlling molding of the at least one mold.

30. The apparatus of claim 16 wherein said means for controlling operation of said rotational molding apparatus comprises a programmable logic controller.

31. The apparatus of claim 30 wherein said means for controlling operation of said rotational molding apparatus further comprises a personal computer.

* * * * *